United States Patent
Wu et al.

(10) Patent No.: US 12,265,179 B2
(45) Date of Patent: Apr. 1, 2025

(54) 3D STRUCTURE SENSING SYSTEM

(71) Applicant: Himax Technologies Limited, Tainan (TW)

(72) Inventors: Min-Chian Wu, Tainan (TW); Cheng-Che Tsai, Tainan (TW); Ching-Wen Wang, Tainan (TW)

(73) Assignee: Himax Technologies Limited, Tainan (TW)

( * ) Notice: Subject to any disclaimer, the term of this patent is extended or adjusted under 35 U.S.C. 154(b) by 66 days.

(21) Appl. No.: 18/234,187

(22) Filed: Aug. 15, 2023

(65) Prior Publication Data

US 2025/0060455 A1 Feb. 20, 2025

(51) Int. Cl.
| | |
|---|---|
| H04N 13/254 | (2018.01) |
| G01S 7/48 | (2006.01) |
| G01S 17/04 | (2020.01) |
| G01S 17/10 | (2020.01) |
| G01S 17/87 | (2020.01) |
| H04N 23/72 | (2023.01) |
| H04N 23/73 | (2023.01) |
| H04N 23/74 | (2023.01) |

(52) U.S. Cl.
CPC ............ *G01S 7/4808* (2013.01); *G01S 17/04* (2020.01); *G01S 17/10* (2013.01); *G01S 17/87* (2013.01); *H04N 13/254* (2018.05); *H04N 23/72* (2023.01); *H04N 23/73* (2023.01); *H04N 23/74* (2023.01)

(58) Field of Classification Search
CPC .......... G01S 7/4808; G01S 7/04; G01S 17/04; H04N 13/254; H04N 23/72
See application file for complete search history.

(56) References Cited

U.S. PATENT DOCUMENTS

| | | | |
|---|---|---|---|
| 2006/0210145 A1* | 9/2006 | Lee ..................... | G06V 10/145 382/154 |
| 2008/0186390 A1* | 8/2008 | Sato ..................... | G06T 3/4053 348/222.1 |
| 2017/0163969 A1* | 6/2017 | Cronie .................. | G06V 10/40 |
| 2019/0295279 A1* | 9/2019 | Wang .................... | G06T 7/586 |
| 2022/0171067 A1* | 6/2022 | Lu ........................ | G01S 17/894 |

FOREIGN PATENT DOCUMENTS

CN 104463775 A * 3/2015 ............... G06T 7/55

* cited by examiner

*Primary Examiner* — Zhubing Ren
(74) *Attorney, Agent, or Firm* — Donald E. Stout; Stout, Uxa & Buyan, LLP

(57) ABSTRACT

A three-dimensional structure sensing system includes an image sensor that receives a reflected light from an object irradiated by an emitted light, the reflected light being converted into image data representing an image of the object; and a depth processing unit that generates depth data according to the image data. It is determined whether the depth data is affected by a reflective surface according to the image data and the depth data.

15 Claims, 5 Drawing Sheets

3D STRUCTURE SENSING SYSTEM

BACKGROUND OF THE INVENTION

1. Field of the Invention

The present invention generally relates to a sensing system, and more particularly to a three-dimensional (3D) or stereo structure sensing system.

2. Description of Related Art

One of the most promising trends in the mobile phone industry is the development of 3D face recognition applications, which can provide higher security and convenience for users. To achieve this, different 3D sensor technologies are needed to capture and process the facial features of the users. Among the various 3D sensor technologies, active light source sensing systems such as time of flight (ToF) and structured light (SL) are very popular, as they can project a pattern of light onto the object and measure the distance and shape of the object based on the reflected light. These systems can also be used for other purposes, such as terrain recognition for robots and self-driving cars, which require accurate and reliable 3D information of the environment to navigate and avoid obstacles.

One of the challenges of designing sensing systems is to ensure that the sensors can accurately detect the presence and properties of different materials. However, some materials, such as mirrors and metals, can interfere with the sensors' performance and cause errors or false readings. This can have serious consequences for applications that rely on sensing systems for safety, efficiency or quality control.

Therefore, it is important to understand how mirrors and metals affect the sensors of sensing systems and how to mitigate their negative effects.

SUMMARY OF THE INVENTION

In view of the foregoing, it is an object of the embodiment of the present invention to provide a three-dimensional (3D) structure sensing system and method capable of determining whether generated depth data is affected by a reflective surface.

According to one embodiment, a three-dimensional structure sensing system includes an image sensor and a depth processing unit. The image sensor receives a reflected light from an object irradiated by an emitted light, the reflected light being converted into image data representing an image of the object. The depth processing unit generates depth data according to the image data. It is determined whether the depth data is affected by a reflective surface according to the image data and the depth data.

DETAILED DESCRIPTION OF THE INVENTION

Figure 1:
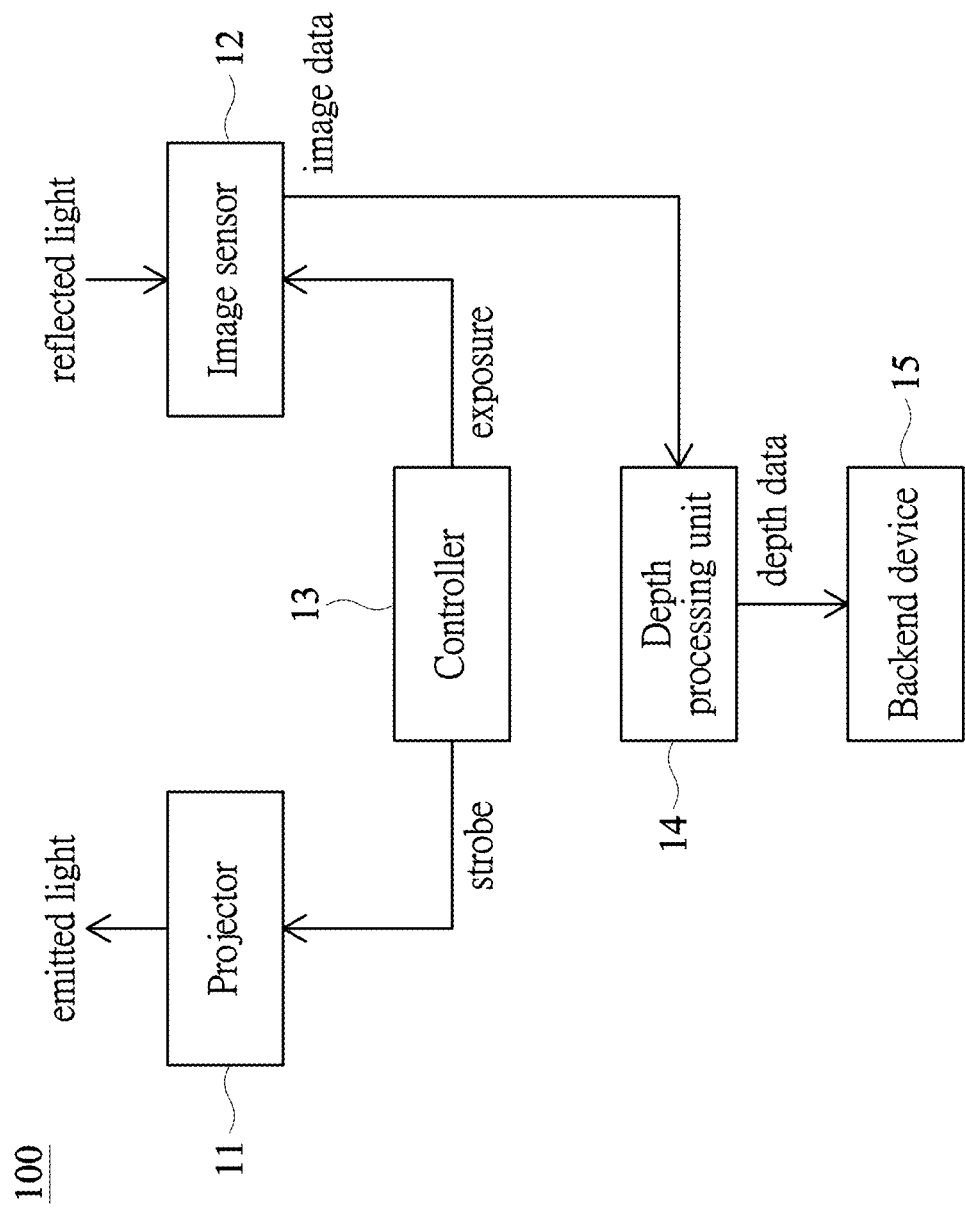
FIG. 1 shows a block diagram illustrating a three-dimensional (3D) or stereo structure sensing system according to one embodiment of the present invention.
Figure 2:
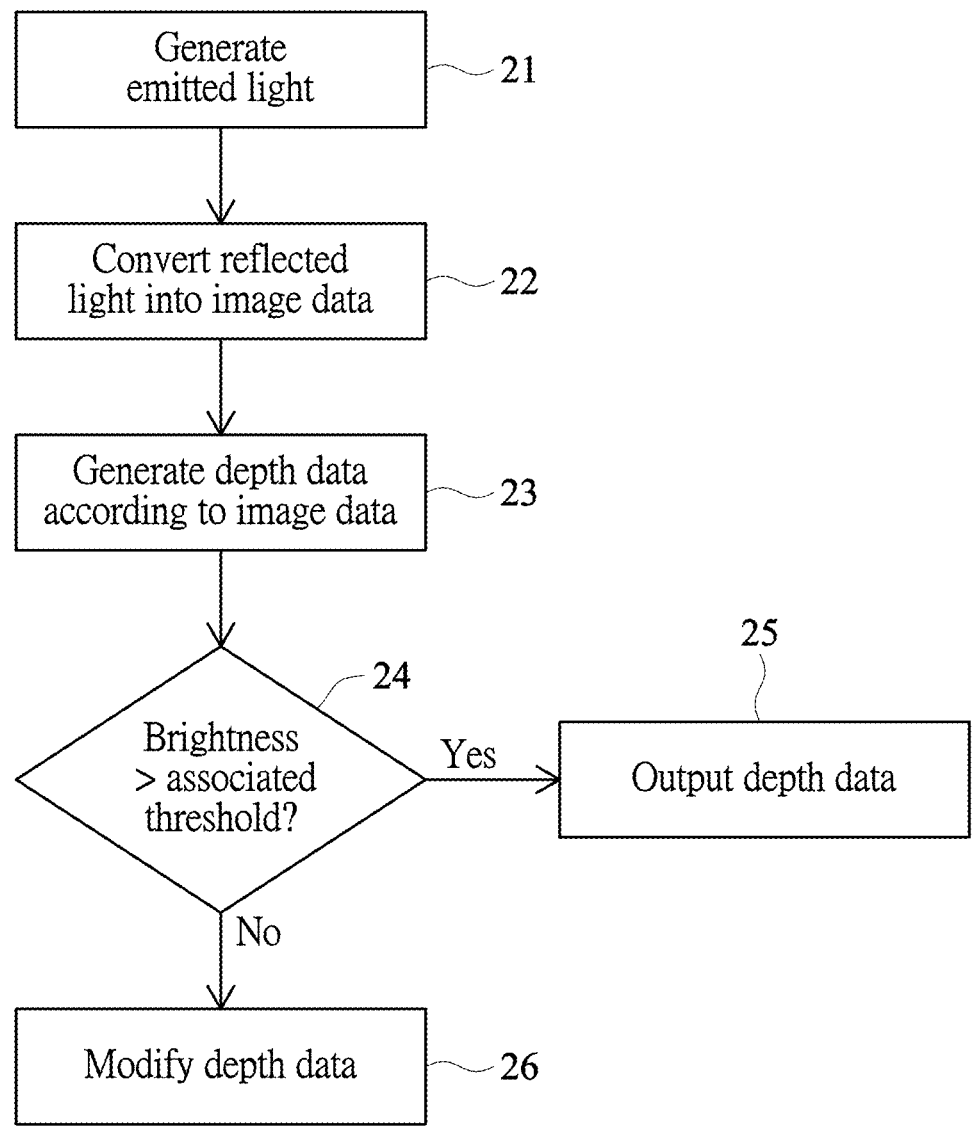
FIG. 2 shows a flow diagram illustrating a 3D (or stereo) structure sensing method adaptable to the 3D structure sensing system of FIG. 1.

FIG. 1 shows a block diagram illustrating a three-dimensional (3D) or stereo structure sensing system 100 according to one embodiment of the present invention, and FIG. 2 shows a flow diagram illustrating a 3D (or stereo) structure sensing method 200 adaptable to the 3D structure sensing system 100 of FIG. 1. The blocks and steps of FIG. 1 and FIG. 2 may be implemented by hardware, software or their combinations. The 3D structure sensing system 100 may, but not necessarily, be adapted to time of flight (ToF) and structured light (SL) applications.

In the embodiment, the 3D structure sensing system 100 (system hereinafter) may include a projector 11, acting as an active light source, configured to emit light (i.e., to generate an emitted light), and the emitted light is then irradiated onto an object to be measured (step 21). In an alternative embodiment, the projector 11 may be omitted and a passive light source, such as ambient light, may be used instead. Generally speaking, the emitted light of the (active/passive) light source may be electromagnetic waves of various wavelengths such as visible light, infrared light or ultraviolet light.

The system 100 of the embodiment may include an image sensor 12 configured to receive a reflected light, which is converted into image data representing an image of the object to be measured (step 22). In one embodiment, the projector 11 and the image sensor 12 adopt time of flight (ToF) or structured light (SL) technique.

In the embodiment, the system 100 may include a controller 13 configured to control timing of emitting light of the projector 11 by a strobe signal, and to control exposure of the image sensor 12 (i.e., amount of light that reaches the image sensor 12) by an exposure signal.

The system 100 of the embodiment may include a depth processing unit 14 configured to generate depth data according to the image data (step 23). The generated depth data represents distance of surfaces of the object to be measured from the image sensor 12. In the embodiment, the depth processing unit 14 may include a depth processor such as an integrated circuit, which is disposed near the image sensor.

Figure 3:
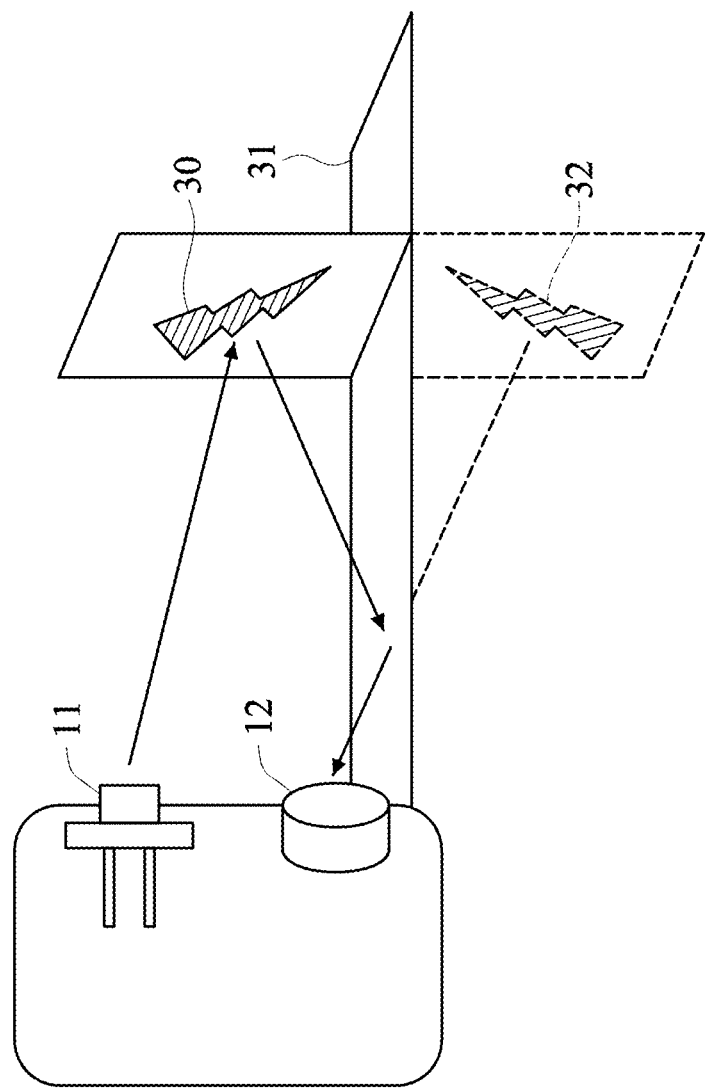
FIG. 3 shows a schematic diagram exemplifying a reflective surface that bounces off the emitted light, thereby producing a virtual image of an object seen in the reflective surface.

According to one aspect of the embodiment, the depth processing unit 14 determines whether the generated depth data is affected by (characteristics of spatial distribution and/or temporal distribution of) a reflective surface, such as a mirror or a metal surface, according to the image data and the depth data. FIG. 3 shows a schematic diagram exemplifying a reflective surface 31 that bounces off the emitted light (from the projector 11), thereby producing a virtual image 32 of an object 30 seen in the reflective surface 31 (e.g., mirror). The virtual image 32 may affect the generated depth data, according to which the object 30 may probably be reconstructed erroneously.

Figure 4:
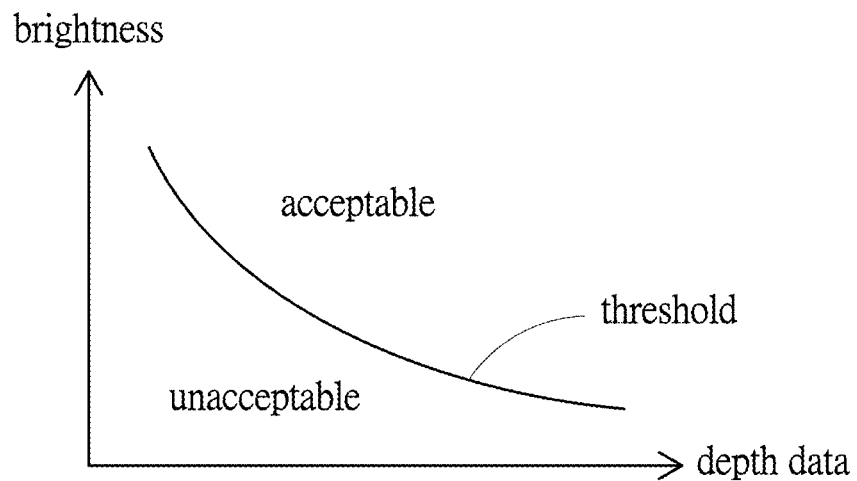
FIG. 4 shows relationship between brightness and depth data.

FIG. 4 shows relationship between brightness (of the image data) and depth data. As shown in FIG. 4, brightness (of the image data) and the depth data are negatively correlated. Brightness greater than a (predetermined) threshold associated with a corresponding depth data is acceptable, otherwise is unacceptable. It is noted that the threshold curve (or line) may unnecessarily be smooth, and objects with different reflectivity may have different threshold curves (or lines).

In the embodiment, brightness (of the image data) is compared to a (predetermined) threshold associated with a corresponding depth data (step 24). If the brightness is greater than the threshold associated with the corresponding depth data (i.e., acceptable brightness), the generated depth data is outputted (step 25), for example, to a backend device 15 such as a computer for further processing or applications. If the brightness is not greater than the threshold associated with the corresponding depth data (i.e., unacceptable brightness), the generated depth data is modified (step 26) before being outputted to the backend device 15. In one embodiment, the depth data corresponding to the unacceptable brightness may be set to a predetermined value (e.g., "0"), which may be recognizable by the backend device 15. In another embodiment, an entire image corresponding to the unacceptable brightness may be skipped.

Figure 5A:
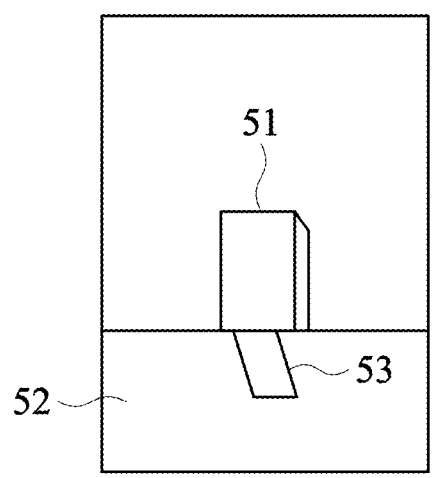
FIG. 5A shows a schematic diagram exemplifying an (erroneously) reconstructed structure with an object placed in front of a reflective surface and the produced virtual image.
Figure 5B:
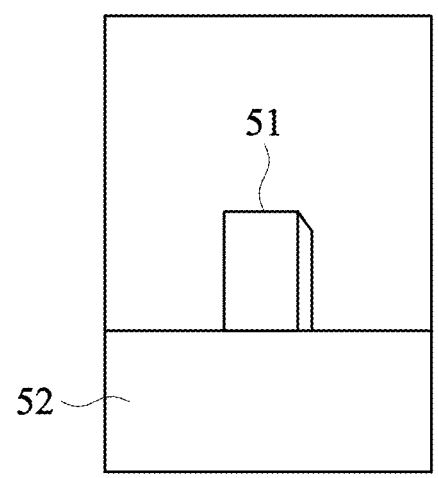
FIG. 5B shows a schematic diagram exemplifying a (correctly) reconstructed structure, in which the virtual image has been blocked out.

FIG. 5A shows a schematic diagram exemplifying an (erroneously) reconstructed structure with an object 51 placed in front of a reflective surface 52 and the produced virtual image 53. FIG. 5B shows a schematic diagram exemplifying a (correctly) reconstructed structure, in which the virtual image 53 (of FIG. 5A) has been blocked out by adopting the embodiment as described above.

Figure 6:
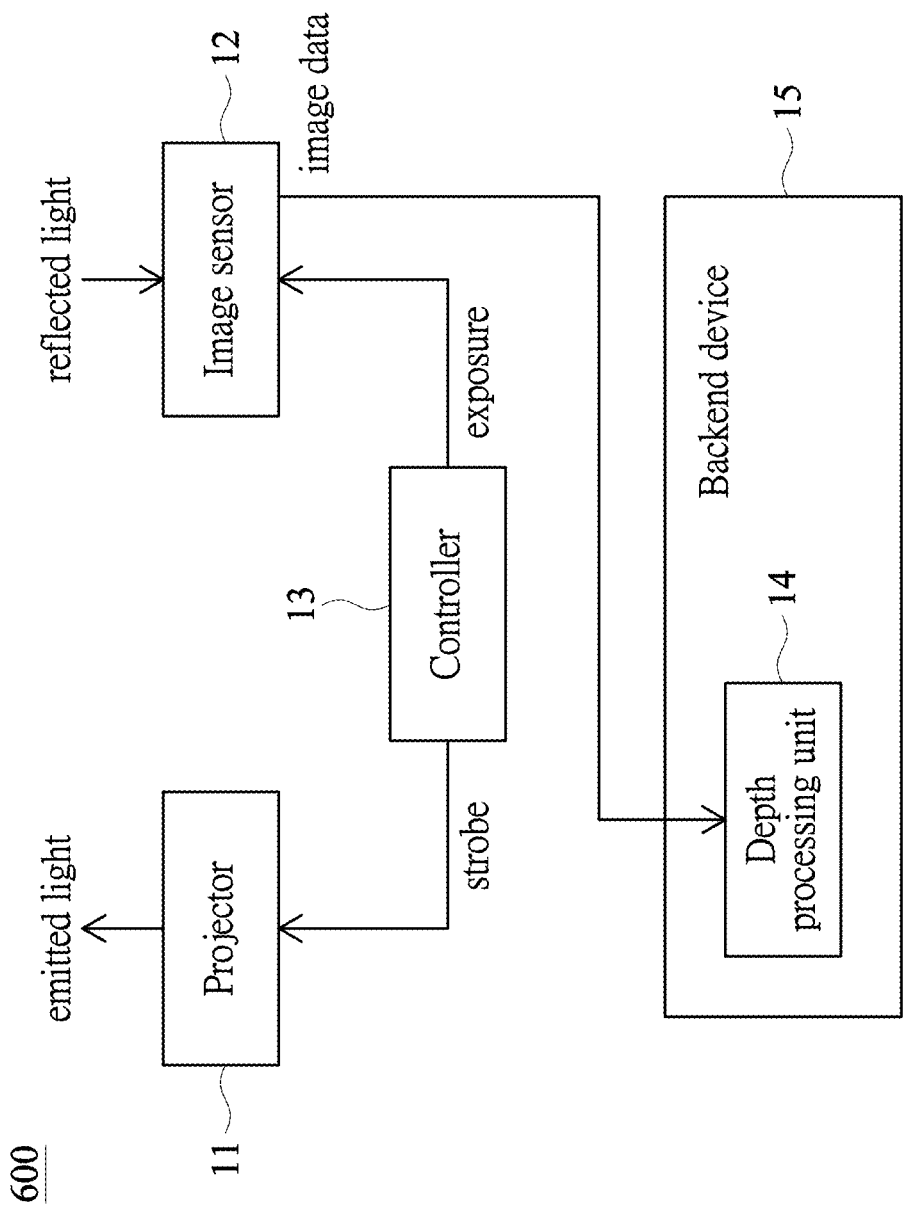
FIG. 6 shows a block diagram illustrating a three-dimensional (3D) or stereo structure sensing system according to another embodiment of the present invention.

FIG. 6 shows a block diagram illustrating a three-dimensional (3D) or stereo structure sensing system 600 according to another embodiment of the present invention. The 3D structure sensing system 600 (system hereinafter) of FIG. 6 is similar to the system 100 of FIG. 1 with the following exceptions.

In the system 600, the depth processing unit 14, including a software component, is disposed at the backend device 15, where depth data is generated (step 23) and is then compared to the brightness (of the image data) to determine whether the generated depth data is affected by a reflective surface, such as a mirror surface, according to the image data and the depth data (step 24).

Although specific embodiments have been illustrated and described, it will be appreciated by those skilled in the art that various modifications may be made without departing from the scope of the present invention, which is intended to be limited solely by the appended claims.

What is claimed is:

1. A three-dimensional structure sensing system, comprising:
    an image sensor that receives a reflected light from an object irradiated by an emitted light, the reflected light being converted into image data representing an image of the object; and
    a depth processing unit that generates depth data according to the image data;
    wherein it is determined whether the depth data is affected by a reflective surface according to the image data and the depth data by comparing brightness of the image data to a predetermined threshold variably associated with a corresponding depth data.

2. The system of claim 1, further comprising:
    a projector that generates the emitted light to be irradiated onto the object.

3. The system of claim 2, wherein the projector and the image sensor adopt time of flight (ToF) or structured light (SL) technique.

4. The system of claim 2, further comprising:
    a controller that controls timing of emitting light of the projector and controls exposure of the image sensor.

5. The system of claim 1, wherein the emitted light comprises ambient light.

6. The system of claim 1, wherein the emitted light comprises visible light, infrared light or ultraviolet light.

7. The system of claim 1, wherein the depth processing unit comprises a depth processor.

8. The system of claim 7, further comprising:
    a backend device that receives the depth data from the depth processor.

9. The system of claim 1, wherein the depth processing unit comprises a software component disposed at a backend device.

10. The system of claim 1, wherein brightness of the image data and the depth data are negatively correlated.

11. The system of claim 1, wherein the depth data is outputted if the brightness is greater than the threshold associated with the corresponding depth data.

12. The system of claim 1, wherein the depth data is modified if the brightness is not greater than the threshold associated with the corresponding depth data.

13. The system of claim 12, wherein the depth data is modified by being set to a predetermined value.

14. The system of claim 12, wherein an entire image is skipped if the brightness is not greater than the threshold associated with the corresponding depth data.

15. The system of claim 1, wherein the reflective surface comprises a mirror or a metal surface.

* * * * *